Aug. 13, 1957 — L. J. HUXHOLD — 2,802,266
MEASURING SHORTENING EXTRACTORS
Filed July 1, 1954 — 2 Sheets-Sheet 1
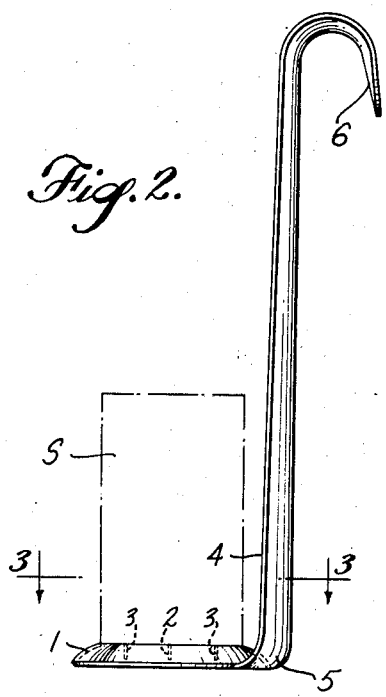
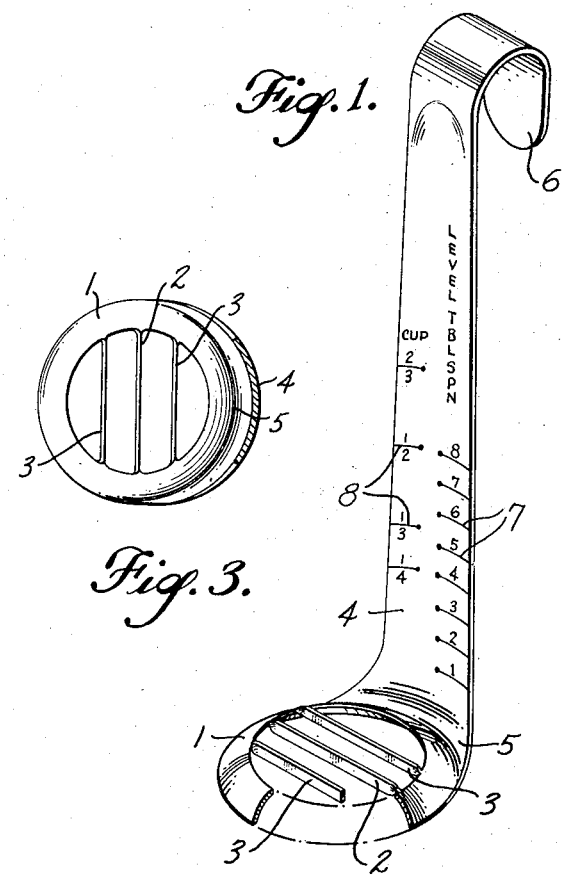
INVENTOR.
LEONARD J. HUXHOLD
BY
ATTORNEYS Aug. 13, 1957 L. J. HUXHOLD 2,802,266
MEASURING SHORTENING EXTRACTORS
Filed July 1, 1954 2 Sheets-Sheet 2
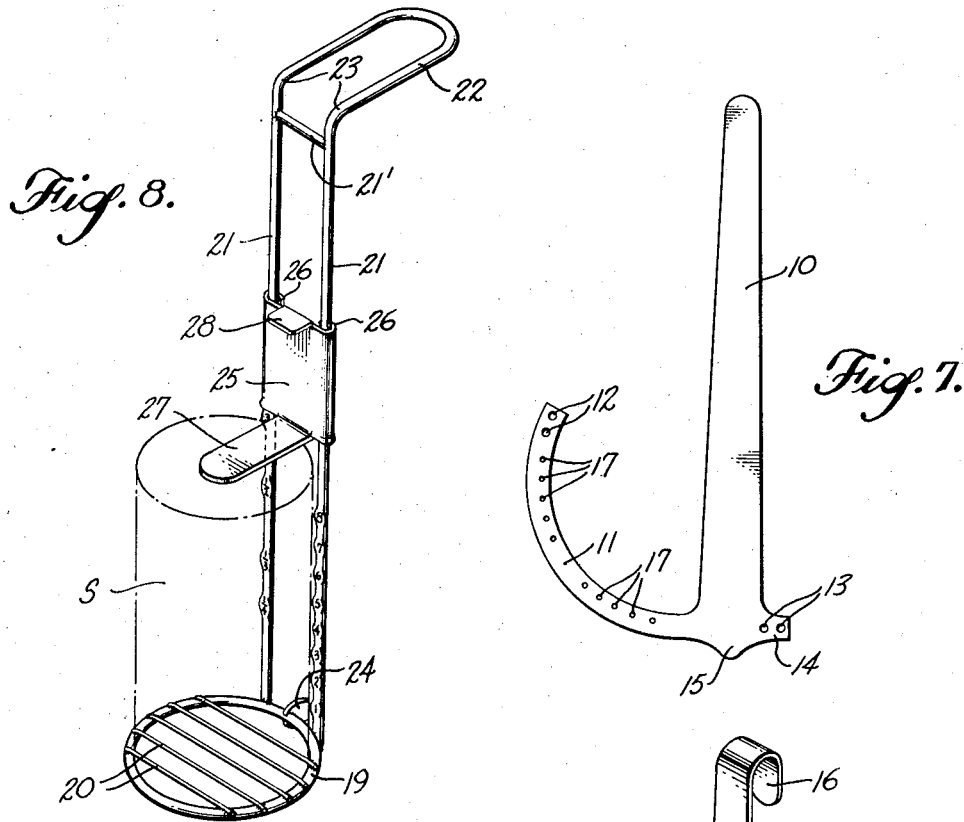
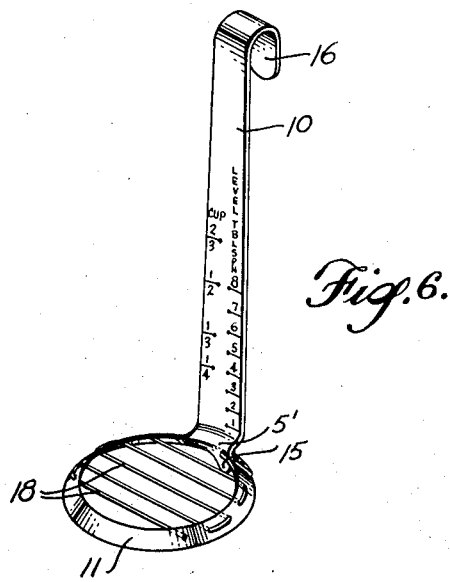
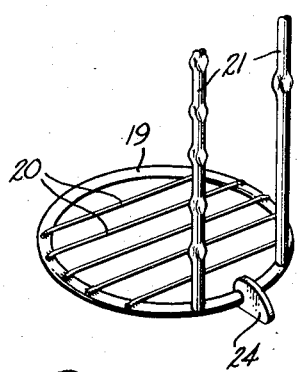
INVENTOR.
LEONARD J. HUXHOLD
BY
Reynolds, Beach & Christensen
ATTORNEYS

United States Patent Office

2,802,266
Patented Aug. 13, 1957

2,802,266

MEASURING SHORTENING EXTRACTORS

Leonard J. Huxhold, near Seattle, Wash.

Application July 1, 1954, Serial No. 440,659

8 Claims. (Cl. 31—11)

The present invention relates to a measuring extractor for shortening of the type which extrudes a block of shortening from a body of shortening in a container, so that the block can be lifted out as distinguished from a container type of measuring device or a dispensing type of device in which a container holds the shortening to be dispensed.

An object of the present measuring extractor for shortening is to enable an accurate quantity of shortening to be removed from the body of shortening in a container as a unit, so that the dispensing operation may be accomplished quickly instead of ladling increments of the amount of shortening desired into a measuring container until it has been filled. In accomplishing this object the shortening in the block removed will be of substantially uniform density, which enhances the accuracy of measurement.

A companion object is to utilize such an extractor with minimum handling and waste of the shortening, so that the least cleaning and washing of hands and utensils following the operation is required.

A further object is to accomplish the objects mentioned above with a utensil which is easy and economical to manufacture, which is light, yet rugged, and can be cleaned easily and thoroughly so that it is very sanitary. Moreover, while such a utensil can measure and dispense blocks of shortening differing widely in size with equal facility, the utensil is small so that it can be stored easily either in a utensil storage facility such as a drawer, a cupboard or a rack, or in the shortening container itself.

An extractor according to the present invention incorporates two principal parts which are interconnected, namely an extruding and cut-off grating and a handle supporting such a grating by its edge. The grating preferably incorporates a marginal ring of substantially circular shape which serves as the extruding element, and a block of shortening extruded by it is cut off and supported by the grating bars as the grating is rotated. Such grating rotation can be effected easily by the handle which is offset from the inner periphery of the ring to be spaced from the extruded shortening block, yet is graduated to provide an index of the volume of the extruded shortening block.

The extractor may be of various designs and constructed in different ways, representative examples of which are shown in the accompanying drawings and described in the following detailed description.

Figure 1 is a top perspective view of a preferred form of measuring shortening extractor with parts broken away. Figure 2 is a side elevation view of this device, and Figure 3 is a transverse sectional view of the device taken on line 3—3 of Figure 2.

Figure 4 is a top perspective view of a portion of a modified form of measuring shortening extractor, parts being broken away.

Figure 5 is a top perspective view of a portion of another modification of the device, having parts broken away.

Figure 6 is a top perspective view of still a different modification of the utensil, and Figure 7 is a plan view of a blank used in the fabrication of such utensil.

Figure 8 is a top perspective view of another type of measuring shortening extractor, and Figure 9 is a top perspective view of a portion of this device taken from a different side.

Shortening commonly is measured for cooking purposes by filling a tablespoon the desired number of times, or by partially filling a measuring cup. The former type of operation takes considerable time and is not very accurate, because one person may pack the shortening as tightly as possible into the tablespoon, and another person may leave air voids so that the tablespoon in each instance will not contain exactly the same amount of shortening. Then it is necessary to remove the shortening from the tablespoon and refill the tablespoon, and in such removal it is difficult to clean the spoon thoroughly. Again, therefore, the measure is inaccurate in varying degrees, depending upon the care with which it is emptied. Each time the tablespoon is filled and emptied such an increment of error occurs.

If the shortening is measured with a cup it is necessary to ladle the shortening by increments into the cup, then pack the shortening down in the cup, and finally to remove the shortening in the cup. Again an error occurs, depending upon how thoroughly the shortening is packed and leveled in the cup and on how thoroughly the shortening is removed from the cup. Whether a tablespoon or a cup measure is used, the measuring procedure is tedious, inaccurate and messy.

The extractor of the present invention can be used to remove from a body of shortening in a container a block of the desired size. Such a utensil, therefore, enables shortening to be removed from a container and used in a manner just as convenient as when it is packed in a package having small increments wrapped separately. The objective is to segregate from the body of shortening a cylinder of substantially uniform density, of constant cross section for various quantities and of a length corresponding to the quantity of shortening which it is desired to be dispensed.

This type of operation can be accomplished by the shortening extruding utensil shown in Figures 1, 2 and 3 of the drawings, for example, which incorporates a grating including the extruding ring 1, shown to be of annular shape and having chordal crossbars, preferably including a diametral crossbar 2 and minor chordal bars 3. Integral with one edge of the extruding ring 1 is a handle 4 extending transversely of the grating and preferably substantially perpendicular to it. Desirably the handle is curved transversely of its length over a major portion of such length generally concentrically with the axis of ring 1.

The types of shortening measuring and extracting utensils shown in Figures 1 to 7, inclusive, are made of sheet metal for the most part, and the forms, shown in Figures 1 to 4, inclusive, are made entirely of sheet metal. The blank for the utensil extrusion ring, crossbars and handles may be stamped from a flat piece of sheet metal, such as of stainless steel or Monel metal .025 to .040 of an inch in thickness, in accordance with the particular shape and arrangement of the various parts in the completed utensil. The portion of such blank from which the grating is to be formed may then be pressed to shape the extruding ring 1 in generally frustoconical shape. In the form of Figures 1 to 3, inclusive, the ring is somewhat convex upwardly, where as the ring of the type of device shown in Figure 4 is somewhat concave upwardly. The crossbars 2 and 3 are then twisted through ninety degrees so that they will have a greater extent axially of the extruding ring than radially perpendicular to such crossbars.

The handle 4 will be bent into a position substantially perpendicular to the grating, so that the two parts will be interconnected integrally by the synclastic connecting portion 5. This interconnecting portion locates the handle offset somewhat from the periphery of the extruding ring. It is preferred that the handle be curved transversely of its length, particularly if it is of substantial width, and that the handle curvature be of substantially cylindrical arcuate shape centered approximately on the axis of the extruding ring. For ease of handling the end of the handle remote from the extruding grating may be bent over in the shape of a hook 6, which may be grasped easily and utilized for hanging the handle to store the utensil.

Graduation index marks 7, which preferably are numbered, are spaced along the length of the handle beginning at the end nearer the extruding grating designating the number of level teaspoons full between the grating and the respective index marks. In addition, index marks 8 may be provided on the handle to represent fractions of a cupful.

The extractor is used by a person grasping the hook 6 of the handle and forcing the extruding ring downward into the body of shortening in a container. The larger edge of the ring will enter the shortening first, and the endwise pressure on the handle will cause a column of shortening to be contracted between the wider and narrower peripheries of the ring sufficiently to insure that all air is removed from the shortening, although it is not confined, so that it will not be compacted appreciably. The column of shortening thus segregated from the remainder of the body will move through the spaces between the grating bars and the smaller periphery of the extruding ring. Since the shortening is not confined as it is pressed through the ring, it will not expand appreciably upon its emergence above the grating.

As the handle is pressed farther downward, the column of shortening extruded through the ring 1 increases in length, and the downward pressure on the handle will be interrupted as soon as the top of the extruded shortening column reaches the level of the desired graduation 7 or 8 corresponding to the quantity of shortening to be extracted from the body. At that time the column of shortening will be free standing since it will be separated from the rest of the shortening in the container by approximately the width of the ring 1, and the shortening under most temperature conditions will be sufficiently stiff so that it will not lean against the handle 4. The crossbars of the grating are thin enough so that as the shortening leaves the ring the sides of the slots formed by the crossbars will contact each other and seal, so that such slots are virtually indistinguishable.

The handle is then given a slight circumferential movement approximately about the center of the extruding ring. Such movement will serve the dual function of causing the bars 2 and 3 to cut off the bottom of the column from the remainder of the shortening body in the container, and the heel of the handle formed by the synclastic connecting portion 5 extending beyond the outer periphery of the extruding ring will break the vacuum between such ring and the body of the shortening in the container, so that the extractor with its cut-off columnar block of shortening can be lifted easily from the container. To free the block of shortening thus extruded from the remainder of the shortening in the container will require a turn of only ninety degrees or even less. When the extractor grating has been placed over the receptacle to receive the shortening, the handle may be tilted to dump the block into such receptable, but between the time upward movement of the handle is begun and such dumping operation the bars 2 and 3 will constitute an adequate support for the shortening block. The cylindrical shortening block S as thus supported is indicated in phantom in Figure 2.

While the extractor shown in Figures 2, 3, and 4 has three crossbars of metal strip material in the grating, the type shown in Figure 4 has only two chordal bars 3', which would be sufficient if the shortening were rather solid, such as if it were kept in cold storage. In this extractor also the extruding ring 1' is shown as having a concave upper surface, instead of convex as in the form of Figures 1, 2 and 3. For most types of shortening, however, the upwardly convex extruding ring has been found to give the smoothest wall to the extracted block of shortening. The construction of the handle 4 and connecting portion 5 in the modification of Figure 4 is the same as described in connection with Figures 1, 2 and 3, and in general the method of fabricating this type is the same as described in connection with the previous embodiment.

In Figure 5 the extruding ring 1'' is shown to be of true frustoconical shape, instead of being either somewhat convex as shown in Figure 1 or somewhat concave as shown in Figure 4. Again, the handle 4 and connecting portion 5 are the same as in the utensils described previously. The crossbars of this extractor grating are not formed as sheet metal strips having their opposite ends integral with the extruding ring, but are formed separately as wires 9. These wires may be quite fine, such as of stainless steel .030 of an inch in diameter, and should be stretched tautly across the extruding ring. Because undoubtedly they will be thinner than the thickness of the sheet metal bars in the previous forms of device, more of them are provided.

In fabricating the extractor shown in Figure 5 the extruding ring and handle portions will be formed as a flat blank of sheet metal first, and then will be shaped to define the frustoconical ring 1', the handle 4 and the connecting portion 5. While the blank is flat and prior to such formation into the form of Figure 5, holes may be drilled adjacent to the inner periphery of the extruding ring for reception of the wires 9. Each of the cross wires is then inserted and anchored individually in the holes after the extruding ring has been formed to its final shape, and such wires may be secured by soldering or welding their ends, or by other appropriate procedure. This extractor will be used in the same way as the extractor shown in Figure 1, as already described.

The problem of forming the extruding ring of frustoconical shape and of shaping the connecting portion 5 is simplified by fabricating an extractor of the type shown in Figure 6 from a blank of the type illustrated in Figure 7. In this case the blank includes a handle-forming portion 10 and an extruding ring-forming portion 11 which is arcuate instead of being circular. Such ring-forming portion 11 will be of an arcuate shape and length such that when it is bent into an annulus so that the holes 12 in its free end are in registry with the holes 13 on the tab 14 projecting in the opposite direction from the end of the handle-forming portion 10, the ring-forming portion 11 will assume the frustoconical shape shown in Figure 6.

In this case the handle-forming portion 10 is connected to the smaller periphery of the extruding ring instead of to its larger periphery. Consequently, the connecting portion 5' is bent outwardly from such ring periphery to offset the handle from the ring aperture so that the handle will be spaced from a cylindrical block of shortening extruded through the ring. Where the handle is connected to the smaller circumference of the extruding ring, a projection 15 extending oppositely from the handle-forming portion 10 is provided in the blank which will constitute a heel when the blank has been formed to the shape of the extractor. When the extractor is turned after a column of the desired length has been extruded, this projection will serve to break the vacuum so that the extractor can be lifted easily from the body of shortening as previously described.

To complete the fabrication of the extractor frame, rivets are secured through holes 12 and 13 to close the extruder ring. The connecting portion 5' is bent to dispose the handle in its relationship offset properly from the extruding ring, and the handle may be bent transversely of its length as in the cases previously described. Also the end of the handle remote from the extruding ring is bent to form the hook 16 which may be grasped in handling the utensil or used to suspend it for storage.

Preferably while still in the flat blank form holes 17 are drilled in the ring-forming strip at appropriate locations to receive wire forming the crossbars of the grating. As described in connection with the type of device shown in Figure 5, each cross wire may be separate from the other. On the other hand, the crossbar wires can be formed as shown in Figure 6 by utilizing a single wire 18 which is threaded back and forth through the holes 17 in the manner shown in Figure 6. Only the two ends of the wire need then be secured to anchor all of the wire crossbars in place.

Instead of the extrusion ring-forming arcuate strip 11 curving from the base of the handle-forming portion 10 toward its free end, such ring-forming portion could curve away from the free end of the handle. In that case the handle would be bent from the larger periphery of the ring outward and then toward its smaller periphery, as are the handles in Figures 1, 2, 4 and 5, in which case it would be unnecessary to provide the projection 15. Except for the connection of the handle being like that shown in the previous types of extractor, the procedure for shaping the handle, for forming the extractor ring, and for placing the crossbar wires in the ring to form the grating would be the same as described above.

The extruding ring of Figure 6 may also be formed from a blank having ring-forming strips equal in length, or of a length more nearly equal than the strip 11 and tab 14 shown in Figure 7. In any event these cooperating strips will be long enough so that their ends can be overlapped and secured together by rivets or spot-welding in a manner similar to that in which the end of strip 11 was described as being secured to the tab 14. Such strips would be curved toward the handle-forming portion 10 at opposite sides of it if the handle is to be connected to the smaller periphery of the ring. If, however, the handle is to be connected to the larger periphery of the extruding ring, such ring-forming parts will be curved away from the handle-forming part of the blank.

A somewhat different type of extractor construction is shown in Figures 8 and 9 in that this extractor is constructed entirely from wire instead of entirely or partially from sheet metal. The grating is formed from an extruding ring 19 of heavy wire, such as of stainless steel not less than 3/16 of an inch in diameter, with a butt-welded or other suitable seam. Across this ring extend the crossbars 20 in the form of relatively fine wires, and such wires can be welded at their opposite ends to the surface of the ring 19 by a spot-welding machine. Any number of such wires can be used provided there are sufficient to support an extruded block of shortening S indicated in phantom in Figure 8 when the extractor is pulled out of a container of shortening.

The handle also is made of wire in the form of a loop having sides 21, and the ends of such sides are welded to the exterior of the extruding ring. The loop 22 may be bent at 23 relative to the portion of the handle extending perpendicular to the extrusion ring 19 to form a grip. In order to maintain the wire sides 21 in substantially parallel relationship a spreader bar 21' of a length equal to the spacing between the ends of the wires secured to the extruding ring 19 may be secured between them at a location spaced from the extruding ring, such as adjacent to the bends 23. For the purpose of breaking the suction when the extractor is to be lifted from a shortening container a heel piece 24 may be welded to the outer periphery of the extrusion ring at any location, but conveniently it may be between the spaced ends of wires 21 secured to the ring 19.

The wire sides 21 may be flattened slightly at intervals along their lengths appropriately spaced apart so that the flattened portions along one wire may be marked with tablespoon graduations, and the flattened portions along the other wire may be marked with fractions of a cupful. Such an extractor can be used in the same manner as the extractor described in connection with Figures 1, 2 and 3. This particular extractor, however, is illustrated as including an additional feature for gauging quantity, namely the slide 25. This slide includes edge portions 26 folded respectively about the wires 21 as guides so that the slide may be moved along the lengths of the wire sides 21.

The end of the slider 25 adjacent to the extruding ring 19 has projecting from it a tongue 27 overlying the extruding grating and parallel to its plane. The slider may be moved along the wires 21 by grasping the handle 22 in one hand and the shifting tab 28 in the other and applying a force to move the slider toward or away from the grating. When the slider is adjusted to place the tongue 27 in registry with the index mark on one of the wires 21, friction of the flanges 26 on the wires 21 will hold the slider in the position to which it has been adjusted. The extractor may then be forced down into the body of shortening until the column extruded by such operation extends to the height indicated by the tongue 27. The extractor may then be rotated and withdrawn as described previously and the tongue engaged by the upper end of the cylindrical block of shortening will assist in preventing such block from tipping off the grating. When it is desired to dump the shortening block, the tongue may be moved out of the way of the block by pulling on tab 28.

While the extractors as described above are formed of sheet metal or of wire or of a combination of sheet metal and wire, it would be entirely feasible to mold an extractor of comparable shape from plastic material if desired. Also, while it is preferred to have the extractor made from as few parts as possible, the extractor could be fabricated from a greater number of parts than described.

I claim as my invention:

1. A shortening extractor comprising a circular extruding grating, an elongated sheet metal handle, and a sheet metal connecting element of synclastic shape connecting said grating and said handle and locating said handle in a position offset from the opening through said grating.

2. A shortening extractor comprising an extruding grating including an extruding ring of substantially frusto-conical shape, and a plurality of crossbars chordally spanning said ring.

3. A shortening extractor comprising an extruding grating including an extruding ring of substantially frusto-conical shape, and a plurality of crossbars chordally spanning the smaller side of said ring.

4. A shortening extractor comprising an extruding grating including an extruding ring of substantially frusto-conical shape, convex on its outer side, and a plurality of crossbars chordally spanning said ring.

5. A shortening extractor comprising an extruding grating including an extruding ring of substantially frusto-conical shape, concave on its outer side, and a plurality of crossbars chordally spanning said ring.

6. A shortening extractor comprising a circular extruding grating including a circular border member and a plurality of chordal members extending chordwise across said border member, said chordal members being disposed to define between them elongated openings, the thickness of each of said chordal members being substantially less than the average width of any of said openings, at least one of said chordal members and at least one arc of said circular border member constituting border members of each of such openings, and an elongated handle connected to said circular border member and projecting substantially perpendicular thereto.

7. The shortening extractor defined in claim 6, in which the extruding grating is of sheet metal and the handle over a major portion of its length is curved transversely of its length generally about the center of the border member.

8. A shortening extractor comprising an extruding grating including a circular extruding ring and a plurality of wires extending crosswise of and secured to said ring in substantially parallel chordal positions, said chordal members being disposed to define between them elongated openings, the thickness of each of said wires being substantially less than the width of any of said openings, adjacent wires and opposite arcs of said ring constituting border members of each of such openings, and a handle connected to said ring and projecting substantially perpendicular thereto.

References Cited in the file of this patent

UNITED STATES PATENTS

| | | | |
|---|---|---|---|
| 153,782 | Richards | Aug. 4, | 1874 |
| 516,415 | Deusen | Mar. 13, | 1894 |
| 631,818 | Reeves et al. | Aug. 29, | 1899 |
| 990,138 | Johnson | Apr. 18, | 1911 |
| 1,084,102 | Olson | Jan. 13, | 1914 |
| 1,326,162 | Anagnostopoulos | Dec. 30, | 1919 |
| 1,436,236 | Cartuschka | Nov. 21, | 1922 |
| 1,447,432 | Roberts | Mar. 6, | 1923 |
| 1,644,899 | Southgate | Oct. 11, | 1927 |
| 1,774,563 | Parsons et la. | Sept. 2, | 1930 |
| 2,091,754 | Fedje | Aug. 31, | 1937 |
| 2,242,607 | Ehlke | May 20, | 1941 |
| 2,399,665 | Deardorff | May 7, | 1946 |
| 2,403,190 | Parraga | July 2, | 1946 |
| 2,589,066 | Duncan | Mar. 11, | 1952 |

FOREIGN PATENTS

| | | | |
|---|---|---|---|
| 915,974 | France | Aug. 5, | 1946 |